United States Patent
Detwiler et al.

(10) Patent No.: US 8,959,492 B2
(45) Date of Patent: Feb. 17, 2015

(54) COMMUNICATION PROTOCOL BETWEEN A HIGH-LEVEL LANGUAGE AND A NATIVE LANGUAGE

(75) Inventors: Stephen Cain Detwiler, Oakland, CA (US); James Edward Marr, San Francisco, CA (US); Payton Russell White, Foster City, CA (US)

(73) Assignee: NgMoco, LLC, San Francisco, CA (US)

( * ) Notice: Subject to any disclaimer, the term of this patent is extended or adjusted under 35 U.S.C. 154(b) by 385 days.

(21) Appl. No.: 13/324,940

(22) Filed: Dec. 13, 2011

(65) Prior Publication Data

US 2012/0167063 A1    Jun. 28, 2012

Related U.S. Application Data

(60) Provisional application No. 61/422,843, filed on Dec. 14, 2010.

(51) Int. Cl.
  *G06F 9/45* (2006.01)
  *G06F 9/445* (2006.01)
  *G06F 9/44* (2006.01)

(52) U.S. Cl.
  CPC ............... *G06F 8/65* (2013.01); *G06F 9/4401* (2013.01)
  USPC ........................................... 717/139

(58) Field of Classification Search
  USPC ........................................... 717/139
  See application file for complete search history.

(56) References Cited

U.S. PATENT DOCUMENTS

| | | | |
|---|---|---|---|
| 5,875,335 A | 2/1999 | Beard | |
| 6,698,014 B1 | 2/2004 | Rechter | |
| 6,993,568 B1 | 1/2006 | Hauduc et al. | |
| 7,117,485 B2* | 10/2006 | Wilkinson et al. | 717/139 |
| 7,272,821 B2 | 9/2007 | Chittar et al. | |
| 7,444,619 B2* | 10/2008 | McManus | 717/114 |
| 7,536,537 B2 | 5/2009 | Linn | |
| 7,574,714 B2* | 8/2009 | Black et al. | 719/330 |
| 2004/0054986 A1 | 3/2004 | Dresselhaus et al. | |
| 2005/0125804 A1 | 6/2005 | Dievendorff et al. | |
| 2005/0166209 A1 | 7/2005 | Merrick et al. | |
| 2007/0005342 A1 | 1/2007 | Ortscheid | |

(Continued)

OTHER PUBLICATIONS

PCT International Search Report and Written Opinion, PCT Application No. PCT/US2011/064966, Apr. 5, 2012, seven pages.

(Continued)

*Primary Examiner* — John Chavis
(74) *Attorney, Agent, or Firm* — Fenwick & West LLP

(57) ABSTRACT

A system and a method are disclosed for communicating between two programming languages on a client device. Commands in a high-level language are encoded as character string containing a series of numbers separated by delimiters, with each component of the command encoded as a different number. The encoded character strings are passed to compiled code that runs natively on the client device, and the native code decodes the character strings into corresponding native commands and executes the native commands. This communication protocol allows applications written in high-level code to perform functions that are typically set aside for native code, such as communicating with web servers and modifying files saved in memory. High-level code may also be transferred to client devices without being subjected to the restrictions that some operating systems place on the transfer for application binaries, which allows application developers to automatically send application updates to users.

20 Claims, 7 Drawing Sheets

(56) References Cited

U.S. PATENT DOCUMENTS

| | | |
|---|---|---|
| 2007/0256062 A1 | 11/2007 | Madden |
| 2008/0127127 A1* | 5/2008 | Chitgupakar et al. ........ 717/137 |
| 2009/0276794 A1* | 11/2009 | Black et al. ................... 719/330 |
| 2010/0191930 A1* | 7/2010 | Groff et al. ................... 711/170 |
| 2010/0192124 A1* | 7/2010 | Hall et al. ..................... 717/106 |
| 2010/0242018 A1* | 9/2010 | Balfe et al. .................... 717/118 |
| 2011/0231644 A1* | 9/2011 | Ishebabi ........................ 713/100 |

OTHER PUBLICATIONS

European Patent Office, Search Report and Opinion, European Patent Application No. 11848314.8, Sep. 24, 2014, seven pages.

* cited by examiner

COMMUNICATION PROTOCOL BETWEEN A HIGH-LEVEL LANGUAGE AND A NATIVE LANGUAGE

CROSS REFERENCE TO RELATED APPLICATIONS

This application claims the benefit of U.S. Provisional Application No. 61/422,843, filed Dec. 14, 2010, which is incorporated by reference in its entirety.

BACKGROUND

1. Field of Art

The disclosure generally relates to the field of programming languages and more specifically to communicating between two different programming languages.

2. Description of the Related Art

Software applications are typically released and distributed as binary executable files. Developers compile code into a binary executable file, and users download and run the compiled application binary on their client devices. A similar process of compiling before public release is used to distribute updates and patches to software application. While this process allows developers to protect their source code and provides users with an executable that runs natively on their client devices, the process also comes with a number of restrictions and drawbacks that make it unappealing for certain platforms.

One drawback is that some operating systems place restrictions on the transfer of executable binaries to client devices as a method of preventing users from running unauthorized code. Operating system developers may put these restrictions in place as a safeguard against the spread of viruses or other malicious code, or they may simply use these restrictions as a way of exerting more control over the operating system. In some cases, the operating system may include a centralized distribution service to manage the distribution of executable binaries, and the binaries being distributed may be subject to review and approval by administrators of the distribution service. For example, the APPLE iOS mobile operating system includes an APP STORE for distributing applications and updates, and content posted to the APP STORE undergoes an approval process before being distributed to users. In other cases, the operating system allows the user to freely download executable binaries, but the operating system may prompt the user for an administrator password or some other sort of authorization before executing a new application or applying an update to an existing application.

These restrictions make it difficult for software developers to distribute executable binaries. In particular, the process of releasing and distributing updates and patches may become significantly slower if the update is subject to a review process or if the update requires user authorization before being applied. As a result, it is difficult to rapidly distribute updates to users. In addition, if a developer wishes to distribute an update that is customized to a user's device configuration, location, or demographic information, each permutation of the customized update may have to undergo the review process before being distributed.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
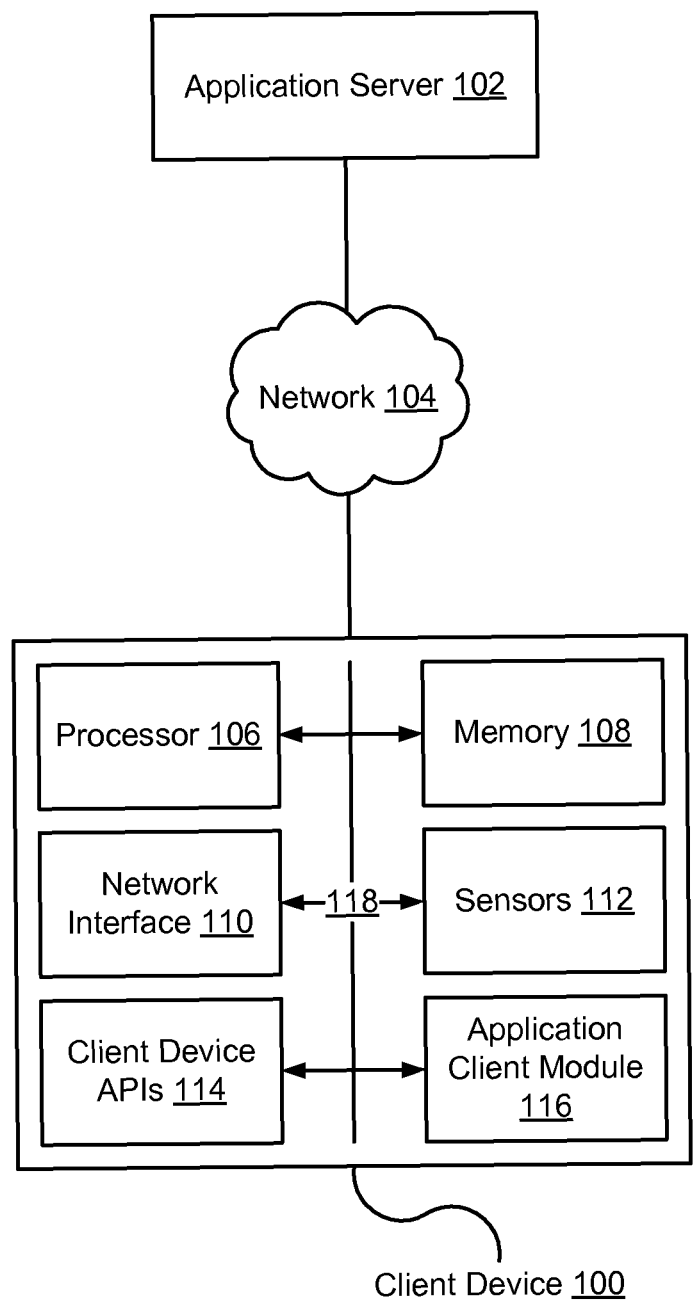
FIG. 1 is a network diagram illustrating a system environment suitable for delivering applications and updates in a high-level language, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Instead of distributing executable binaries, applications and updates may be written and distributed to client devices in a high-level language, such as JavaScript. To run the high-level applications, users install an application client module on their client devices. The application client module implements a communication protocol that allows the high-level language to communicate with compiled code that runs natively on the client device. The communication protocol allows high-level applications to access system resources that are typically reserved for native code, such as networking devices and physical sensors. As a result, applications written in the high-level language may perform tasks that are normally restricted to an executable application binary, which allows a high-level application to provide a user experience that is similar to the user experience of a binary application.

The communication protocol operates by encoding high-level commands as character strings containing a series of numbers and control characters. Each number represents a different component of a command, such as a class identifier, a method identifier, and one or more parameters that are passed into the method. Encoded character strings are sent to a different component of the application client module that decodes the character strings into native commands and executes the commands. To reduce the complexity of the high-level code and thus reduce the computing resources that are used to operate the communication protocol, the application client module also contains several application programming interfaces (APIs) that allow provide simplified commands for accessing system resources such as the graphics processor, physical sensors, and network interface. The native code may also use the communication protocol to issue commands to the high-level code.

Since the encoding and decoding processes for a command use a significant amount of computing resources, the application client module may also implement a queuing mechanism to encode and decode several commands at once. In one embodiment, high-level commands that are issued during a predetermined time interval, called a processing frame, are added to a queue in the order in which the commands are issued. At the end of the processing frame, the commands in the queue are encoded as character strings. The character strings are subsequently decoded into native commands and the native commands are executed in the same order in which the corresponding high-level commands were added to the queue. This queuing mechanism allows the application client module to improve performance by encoding and decoding multiple commands at once while still preserving the original order of the high-level commands.

By distributing executable content in a high-level language, the content is not subject to restrictions that an operating system may place on the distribution of binary applications and updates. When an application or update is transferred to a client device in the high-level language, the operating system interprets the activity as a transfer of data, not a transfer of executable code, and allows the transfer to proceed without imposing the restrictions associated with transferring executable code. As a result, it is possible for high-level applications to check for and apply updates during the application boot process, and it is also possible for developers to provide a customized user experience by automatically distributing high-level updates that are tailored to a user's geographic location, demographic group, device configuration, and other personal information. Although this process of downloading and executing high-level applications may bypass some of the security measures that are integrated into the application distribution system or the operating system, the application client module contains features that preserve the security of the client device by restricting the level of privilege that is granted to individual high-level applications.

Overview of System Architecture

FIG. 1 is a network diagram illustrating a system environment suitable for delivering applications and updates in a high-level language, according to one embodiment. The system environment includes, among other components, an application server 102, a network 104, and a client device 100. In other embodiments, there may be fewer, additional, or different components in the system environment. In particular, although only one client device 100 and one server 104 are pictured, there may be additional client devices or servers connected to the network 102.

The application server 102 operates server-based services that support the application client module 116 and any high-level applications that may be saved on the client device 100. In particular, the application server 102 makes high-level applications and updates available for distribution to users, so the application client module 116 may retrieve updates and new applications from the application server 102 either automatically or in response to a user request. The application server 102 may also provide additional application-related services, such as application-integrated social networking or data collection and analysis. Although the application server 102 is depicted as a single entity, the functions of the application server 102 may be spread over multiple computing devices, computing clusters, or data centers, and the components of the application server 102 may reside in multiple geographic locations.

The application server 102 communicates with a plurality of client devices 100 over the network 104. The network 104 may comprise any combination of standard communication technologies and protocols as well-known in the art. For example, communications may be carried over the network 104 by link technologies such as Ethernet, 802.11, CDMA, 3G, 4G, or digital subscriber line (DSL). The network 104 may support a plurality of networking protocols, including the hypertext transfer protocol (HTTP), the transmission control protocol/internet protocol (TCP/IP), or the file transfer protocol (FTP), and any of the data transferred over the network 104 may be encrypted with technologies such as transport layer security (TLS), secure sockets layer (SSL), and internet protocol security (IPsec).

FIG. 1 also contains a detailed view of the client device 100. The client device 100 includes, among other components, a processor 106, memory 108, a network interface device 110, physical sensors 112, client device APIs 114, and the application client module 116. The components 106, 108, 110, 112, 114, 116 of the client device 100 are communicatively coupled through a system bus 118. As a whole, the client device 100 may be any computing device that includes these components 106, 108, 110, 112, 114, 116, such as a smartphone, personal digital assistant (PDA), tablet computer, laptop computer, or desktop computer.

The processor 106 executes computer-readable instructions. The processor 106 may access the memory 108, either to retrieve instructions for execution or to read or write data. Although only a single processor 106 is shown in FIG. 1, the client device 100 may contain multiple processors 106 that may operate in parallel. The client device 100 may also contain dedicated processors 106 for graphics processing or audio processing. The memory 108 is any non-transitory computer-readable storage medium capable of storing data and computer-readable instructions that may be executed by the processor 106. The memory 108 may comprise a combination of volatile memory (e.g., random access memory) and non-volatile memory (e.g., hard disk drive, solid state drive, compact discs, magnetic tape). The network interface device 110 connects to the network 104 and exchanges data between the network 104 and the other components of the client device 100.

The physical sensors 112 may include any device that monitors the client device's orientation or surroundings. For example, sensors may include an accelerometer, gyroscope, global positioning service (GPS) receiver, compass, or ambient light detector. The physical sensors 112 may also include devices to record user input to the client device 100, such as external buttons, a keyboard, a mouse, a touchscreen, or a microphone.

The operating system may provide one or more client device application programming interfaces (APIs) 114 that allow binary software applications to interact with the physical components of the client device 100. The operating system may include APIs for interacting with the physical sensors 112, the network interface device 110, or output devices such as screens or speakers that may be controlled by dedicated graphics or audio processors 106.

The application client module 116 implements a communication protocol that allows one or more applications written in a high-level programming language to communicate with native code. One benefit of the communication protocol is that the protocol allows the high-level applications to perform tasks that are normally reserved for native code, such as modifying other applications saved in the memory 108 or communicating with the application server 102 through the network interface device 110. To streamline the communication between the high-level applications and native code, the application client module 116 also contains a set of application client APIs that simplify the interaction between the high-level applications and the APIs 114 provided by the operating system. Although the application client module 116 is shown as a separate entity, the logic to perform the functions of the application client module 116 may reside in whole or in part on the processor 106 or the memory 108. In addition, all or part of the application client module 116 may be embodied as a separate hardware device, such as an application specific integrated circuit (ASIC) or field programmable gate array (FPGA).

Application Client Module

Figure 2:
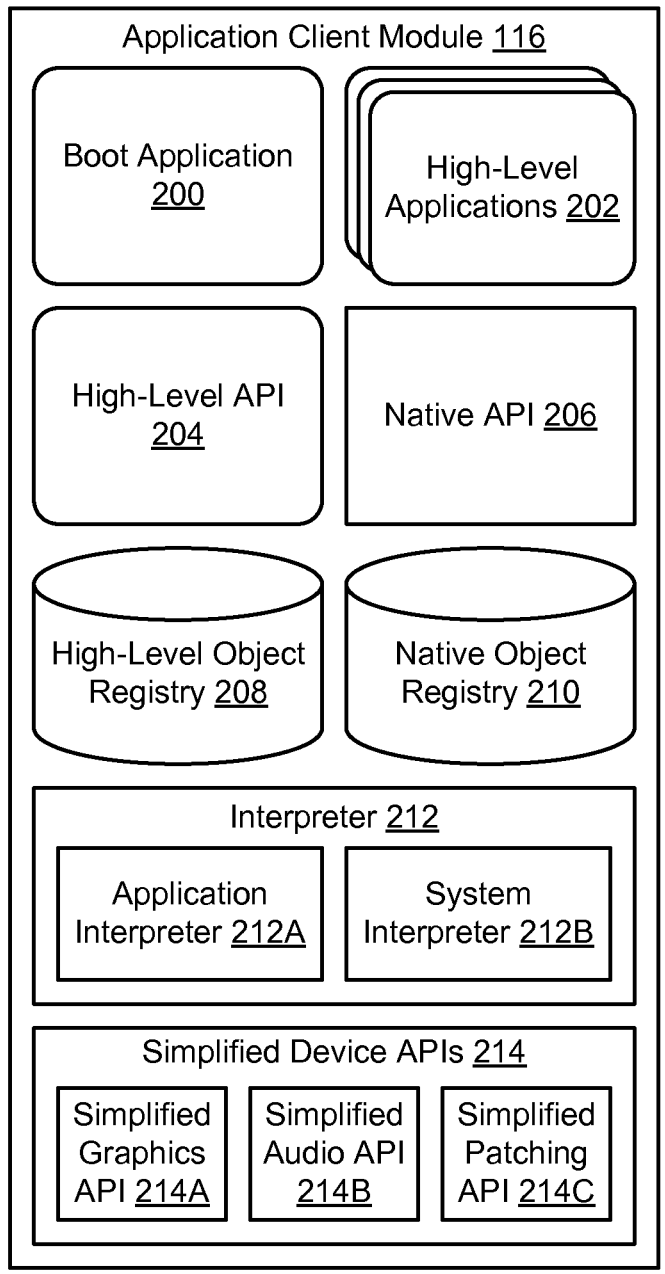
FIG. 2 is a block diagram illustrating the application client module of the client device, according to one embodiment.

Referring now to FIG. 2, illustrated is a detailed view of the application client module 116 shown in FIG. 1, according to one embodiment. The application client module 116 may contain, among other components, a boot application 200, one or more additional high-level applications 202, a high-level API 204, a native API 206, a high-level object registry 208, a native object registry 210, an interpreter 212, and a set of simplified device APIs 214. Other embodiments of the application client may contain additional, fewer, or different components.

The boot application 200 is an application written in an interpreted high-level programming language (e.g., JavaScript) that receives a reference to a high-level application 200, 202 and attempts to update the referenced application. After receiving a referenced application, the boot application 200 queries the application server 102 to determine whether an updated version of the referenced application is available for download. If the boot application 200 finds an update on the application server 102, then the boot application 200 automatically retrieves and applies the update. The update can be retrieved and applied without any intervention or authorization from the user or the operating system because the update is also written in the high-level language.

When the application client module 116 receives a request to launch an application 202, the native API 206 issues two commands to the boot application 200. The first command contains a reference to the boot application 200, which causes the boot application 200 to update itself. The second command contains a reference to the requested application 202, which causes the boot application 200 to update the requested application 202. The process of updating the boot application 200 and the requested application 202 is described in detail with reference to FIG. 3.

The high-level applications 202 are software applications such as games, image editors, or multimedia playback programs that may be downloaded to the client device 100. The download may be initiated by a user of the client device 100 or by another application 202 within the application client module 116. Similar to the boot application 202, the high-level applications 202 are also written in an interpreted high-level programming language. As used herein, a high-level programming language is any programming language that may be executed by the interpreter 212 on the client device instead of being compiled before being distributed to the client device (e.g., JavaScript). In addition to the high-level code, applications 202 may also contain other data items, such as images, videos, audio clips, or plaintext. Since the high-level applications 202 are written in the high-level programming language, the operating system interprets the download of a high-level application 202 as the download of a data file. As a result, the download is not subjected to any restrictions that the operating system may place on the download of executable binary applications. Although this might bypass some security functions that may be integrated into the operating system, the interpreter 212 and the native API 206 contain security functions that regulate the level of access granted to the downloaded high-level application 202.

The high-level API 204 and native API 206 are application programming interfaces (APIs) that provide a unified interface for the functions in the simplified device APIs 214. While the APIs 204, 206 contain matching classes and methods, the high-level API 204 is written in the same high-level language as the boot application 200 and the other applications 202, whereas the native API 206 is a binary that runs natively on the client device 100. The high-level API 204 and native API 206 also contain logic to arrange the commands for a single processing frame in a queue, send the queue to the interpreter 212 to be encoded as character strings, and decode the character strings back into commands. The encoding functions are described in detail with reference to FIG. 4, and the queuing mechanism is described with reference to FIG. 6. By unifying the functions of the individual simplified device APIs 214, developers can refer to a single API to interact with the hardware on the client device 100. This simplifies the development process and reduces the possibility of classes or methods being attributed to the wrong API.

The high-level object registry 208 and the native object registry 210 maintain mirrored registries of the live objects in running applications 202. In one embodiment, objects are initially registered in the high-level object registry 208 and the entries are subsequently mirrored to the native object registry 210. The process of registering new objects and mirroring objects between the two registries 208, 210 is described in detail with reference to FIG. 7.

The interpreter 212 loads and executes high-level code, such as the code in the boot application 200, the other applications 202, and the high-level API 204. When an application 200, 202 includes a command that is to be executed by native code, the interpreter 212 encodes the command and sends the command to the native API 206 to be decoded and executed. There are two separate instances of the interpreter 212. An application interpreter 212A has low privilege access to the client device 100. For example, the application interpreter 212A may be able to access on-screen graphics, user interface (UI) and audio functions, and other application-related functions. Meanwhile, a system interpreter 212B has high privilege access to the client device 100, including access to parts of the client device 100 that may cause system instability. For example, the system interpreter 212B may use the network interface 110 to transfer authentication credentials to the application server 102 or modify the boot application 200 or the other applications 202 that are stored in the memory 108.

Since the boot application 200 makes frequent use of high-privilege functions, such as accessing the application server 102 and modifying the applications 200, 202 stored in the memory 108, the boot application 200 is executed by the system interpreter 212B. Other applications 202 are executed by the application interpreter 212A. If one of the other applications 202 includes a command that is to be executed with high privilege, the application interpreter 212A sends the command to the native API 206, and the native API 206 determines whether the command should be allowed. For example, the native API 206 may allow the execution of a command to retrieve social networking data from the application server 102, but the API 206 may not allow an application 202 to execute a command to arbitrarily modify or erase another application 202. If the native API 206 allows a high privilege command to execute, then the command is routed to the system interpreter 212 for execution. This configuration allows the applications 202 to access high privilege functions of the client device 100 while still maintaining the security of the client device 100 by providing protection against improper and potentially harmful high privilege commands.

The simplified device APIs 214 provide a simplified interface that high-level applications 200,202 can use to interact with the client device APIs 114 provided by the operating system. For example, the simplified graphics API 214A may provide a simple way to position an image on the screen with a single command, whereas placing the same image in the same position on the screen may require a complex series of calls to the appropriate graphics API in the client device APIs 114. In addition, the application client module 116 may implement different versions of the simplified device APIs 214 to interact with the client device APIs 114 on different client devices 100. For example, the graphics API in APPLE iOS may require a first series of commands to position an image on the screen, whereas positioning the image using the graphics API in the GOOGLE ANDROID operating system may require a second series of commands that is different from the first series of commands. In this case, the simplified positionImage command in iOS version of the simplified graphics API 214A would perform the first series of commands, and the positionImage command in the ANDROID version of the simplified graphics API 214A would perform the second series of commands. As a result, the simplified device APIs 214 provide a standard set of commands that can be used to interact with the hardware, firmware, and software layers of different devices 100 and different operating systems, which allows the same high-level code in the boot application 200, other applications 202, and high-level API 204 to function across different device configurations.

Together, the mirrored APIs 204, 206, the mirrored object registries 208, 210, the interpreter 212, and the simplified APIs 214 provide a standardized interface between the high-level applications 202 and the operating system's built-in APIs 114. This means the same high-level applications 202 may be executed on different operating systems and different client devices 100 as long as an application client module 116 is installed on the device. Consequently, developers may reach a wider audience of users across multiple operating systems and devices without writing multiple OS- or device-specific versions of an application 202.

Applying Automatic Updates

Figure 3:
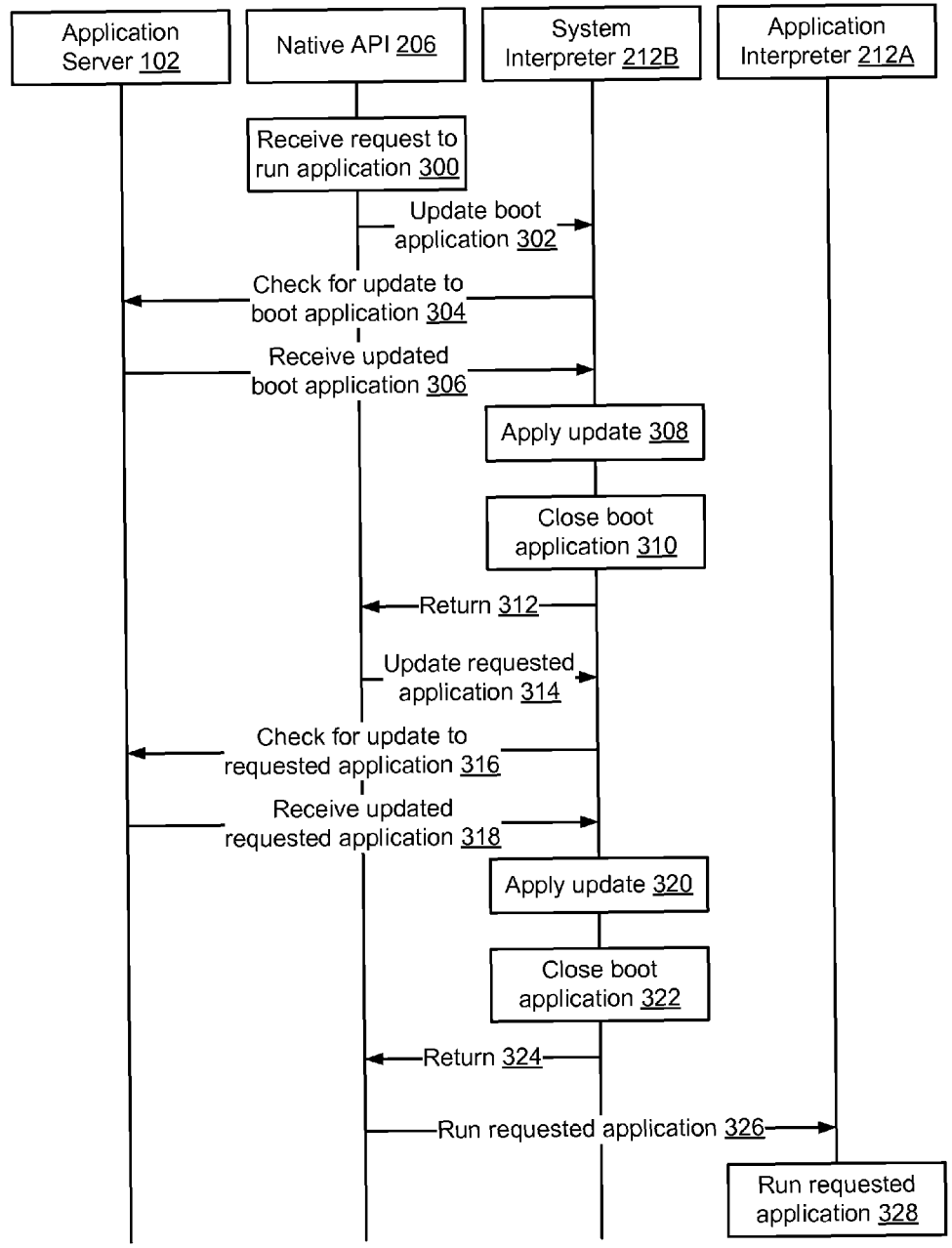
FIG. 3 is an interaction diagram illustrating an example process for automatically applying an update to a requested application before the application is run, according to one embodiment.

FIG. 3 is an interaction diagram between the application server 102, the native API 206, the system interpreter 212B, and the application interpreter 212A illustrating an example process for automatically updating a high-level application 200 during the application's boot process, according to one embodiment. The process begins when the application client module 116 receives 300 a request to run an application. The request is typically received as a user input from one of the sensors 112 (e.g., a touchscreen), although the request may also originate from a different source, such as a different application. After the request is received at the application client module 116, it is routed to the native API 206, which responds by issuing 302 a first command that instructs the system interpreter 212B to update the boot application 200.

To update the boot application 200, the system interpreter 212B loads and executes the boot application 200 with an instruction to update itself. The high-level code in the boot application 200 causes the system interpreter 212B to check 304 the application server 102 to determine whether a newer version of the boot application is available. The system interpreter 212B is able to access 304 the application server 102 by using the interpreter's 212B higher access privileges to interact with the network interface device 110 and send the proper authentication credentials to the application server 102.

If no update is found on the application server 102, then the system interpreter 212B skips the update process 308 and closes 310 the boot application. If an update to the boot application 200 is found, then the system interpreter 212B receives 306 the update from the application server 102 and applies 308 the update. In one embodiment, the system interpreter 212B replaces the entire boot application 200 with the updated version during the update process 308. Alternatively, the system interpreter 212B may replace a subset of the high-level code in the boot application 200 (e.g., only the lines of code that are new or different) during the update process 308. Again, the system interpreter 212B is able to modify the boot application 200 because the system interpreter 212B has higher privileges than the application interpreter 212A.

After the system interpreter 212B updates 308 the boot application 200, the system interpreter 212B closes the boot application 310 and uses a return statement to return 312 to the native API. Next, the native API 206 issues 314 a second command that instructs the system interpreter 212B to update the application 202 that was requested. The system interpreter 212B uses a similar process to update the requested application 202. First, the system interpreter 212B loads the boot application 200 with an instruction to update the requested application 202. The high-level code in the boot application 202 causes the system interpreter 212B to check 316 for an updated version of the requested application 202 on the application server 102. Again, if no update is available on the application server 102, the system interpreter 212B skips the update process 320 and closes 322 the boot application without modifying the requested application 202. If an update is available, then the system interpreter 212B receives 318 and applies 320 the update. In addition to new or different high-level code, the update for the requested application 202 may also include additional data objects, such as movies, audio clips, images, or plaintext.

When updating the requested application 202, the system interpreter 212B may receive 318 an update that is customized to the user's personal information (e.g., the user's geographic location, demographic information, device configuration, etc). The application server 102 may obtain the user's personal information from the various sensors 122 on the client device 100 (e.g., a GPS receiver) at the time of the update request 316. Alternatively, the user may have voluntarily provided the information to the application server 102 beforehand (e.g., when using the application server's social networking functions). After applying the update, the system interpreter 212A closes 322 the boot application 200 and uses a second return statement to return to the native API 206. Finally, the native API 206 issues 326 a third command instructing the low-privilege application interpreter 212A to load and execute 328 the requested application.

This configuration is advantageous for several reasons. By automatically updating the boot application 200 and the requested application 202 before the application 202 is launched, both the boot application 200 and the requested application 202 remain up to date without requiring the user to manually request updates. In addition, the ability to customize application updates based on a user's personal information also allows application developers to provide a richer and more personalized user experience.

Encoding Commands as Character Strings

Figure 4:
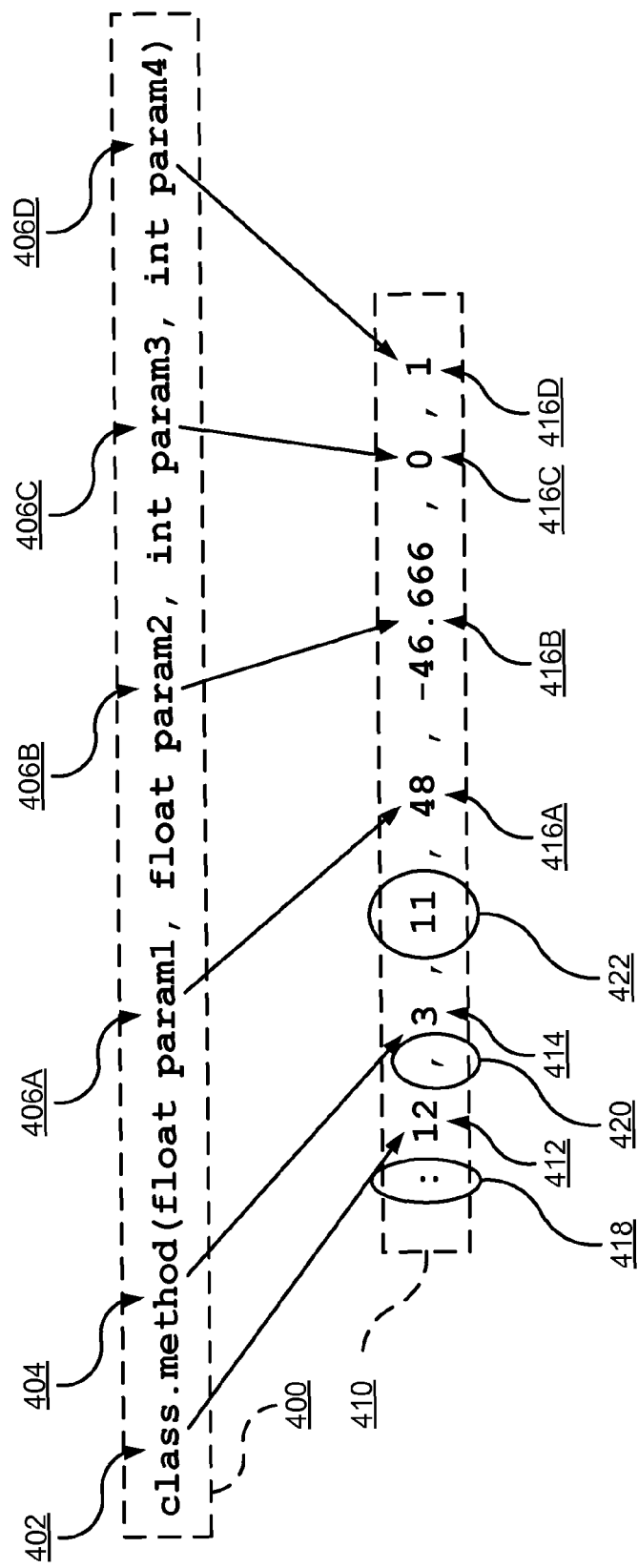
FIG. 4 is an example of a mapping from a command in a high-level language to an encoded character string, according to one embodiment.

FIG. 4 illustrates an example of a mapping from a command 400 in a high-level language to an encoded character string 410, according to one embodiment. The interpreter 212 encodes high-level commands 400 into character strings 410 and sends the character strings to the native API 206, where the character strings 410 are decoded and executed as native commands. The communication protocol defined by this method of encoding allows the high-level language to perform commands that are typically reserved for native code.

The command 400 in the high-level language may comprise, for example, a class 402, a method 404, and four input parameters 406. The encoded character string 410 may comprise, for example, a numerical class identifier 412 corresponding to the class 402, a numerical method identifier 414 corresponding to the method 404, and the values 416 of the input parameters 406. The interpreter 212 and the native API 206 predetermine the order of the input parameters 406 for each method so that the numbers 416 in the character string 410 representing the values of the parameters 406 may be mapped to the correct parameters when the native API 206 decodes the character string 410. In alternative embodiments, the command 400 and the encoded character string 410 may include additional, fewer, or different components. For example, the command 400 may include additional parameters 406, which would cause the encoded character string to include additional parameter values 416.

In addition to the numbers representing the class, method, and parameters of the high-level command, the encoded character string 410 also contains two types of control characters. A first type of control character (the colon) 418 indicates the beginning of a command, and a second type of control character (the comma) 420 separates different entries in the character string 410. Although spaces are added throughout the character string 410 as shown in FIG. 4 to improve readability, the spaces have no function and may be omitted. The encoded character string 410 also contains an instance identifier 422 referring to a specific instance of an object within a class. The high-level API 204 assigns an instance identifier 422 to an instance of an object when the object is registered in the high-level object registry 208, and the interpreter 212 retrieves the instance identifier 422 from the high-level object registry 208 when encoding the command 400. In the embodiment shown in FIG. 4, the instance identifier 422 is placed between the numerical method identifier 414 and the values of the parameters 416.

The mapping between the class 402 and method 404 and their respective numerical identifiers 412, 414 is configured so that the original command 400 can be recreated as a native command using the encoded character string 410. In one embodiment, the mapping from the text identifiers 402, 404 to the numerical identifiers 412, 414 is predetermined, but the mapping may also be randomly generated and reproduced between the interpreter 212 and the native API 206. In addition, the mapping between the method 404 and the numerical method identifier 414 may not be a one-to-one mapping. Methods 404 with similar functions may be mapped to the same numerical method identifier 414. For example, methods 404 to rotate, translate, and scale a sprite on the screen may be mapped to a numerical method identifier 414 corresponding to a generalized method in the native API 206 to transform a sprite on the screen. In an alternative embodiment, the class 402 and the method 404 may be mapped to a single composite numerical identifier instead of two separate numerical identifiers 402, 404. Again, the mapping need not be a one-to-one mapping. Any other changes may be made to the mapping process as long as the native API 206 is able to reproduce the high-level command 400 as a native command.

Figure 5:
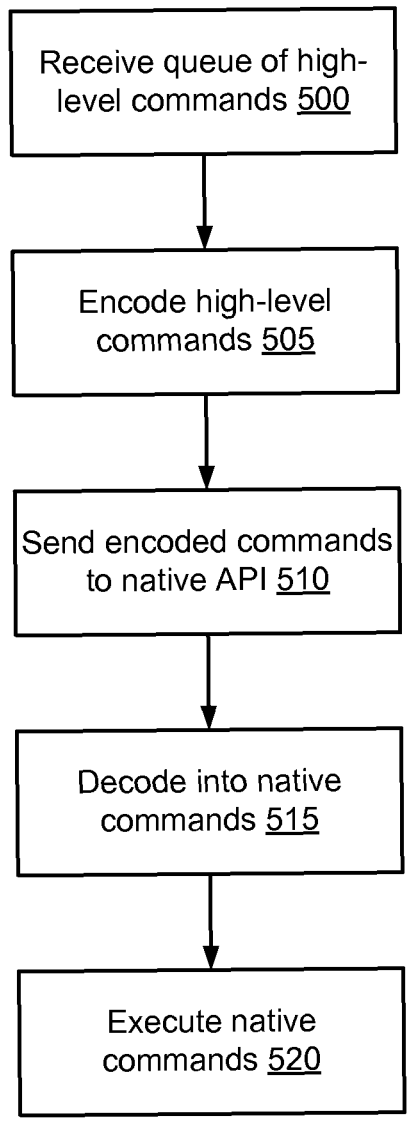
FIG. 5 is a flow chart illustrating a process for translating high-level commands into corresponding native commands and executing the corresponding native commands, according to one embodiment.

FIG. 5 is a flow chart illustrating a process for translating commands written in a high-level language into native commands and executing the native commands, according to one embodiment. The process begins when the interpreter 212 receives 500 a queue of high-level commands from the high-level API 204. The process of assembling high-level commands in a queue is described in detail with reference to FIG. 6. The interpreter 212 encodes 505 the high level commands as character strings according to the process described with reference to FIG. 4. The interpreter 212 arranges the encoded character strings in the same order as the corresponding high-level commands in the queue so that the commands can be executed in the same order in which they were queued.

After receiving 500 the queue of high-level commands and encoding 505 the commands as character strings, the interpreter 212 sends 510 the encoded commands to the native API 206. The native API 206 decodes 515 the character strings into native commands by reversing the mapping process that was performed during the encoding process 505. Finally, the native API 206 executes 520 the decoded native commands using the matching classes and objects in the native API 206 and the native object registry 210.

Interactions Between a High-Level Scripting Language and Native Code

Figure 6:
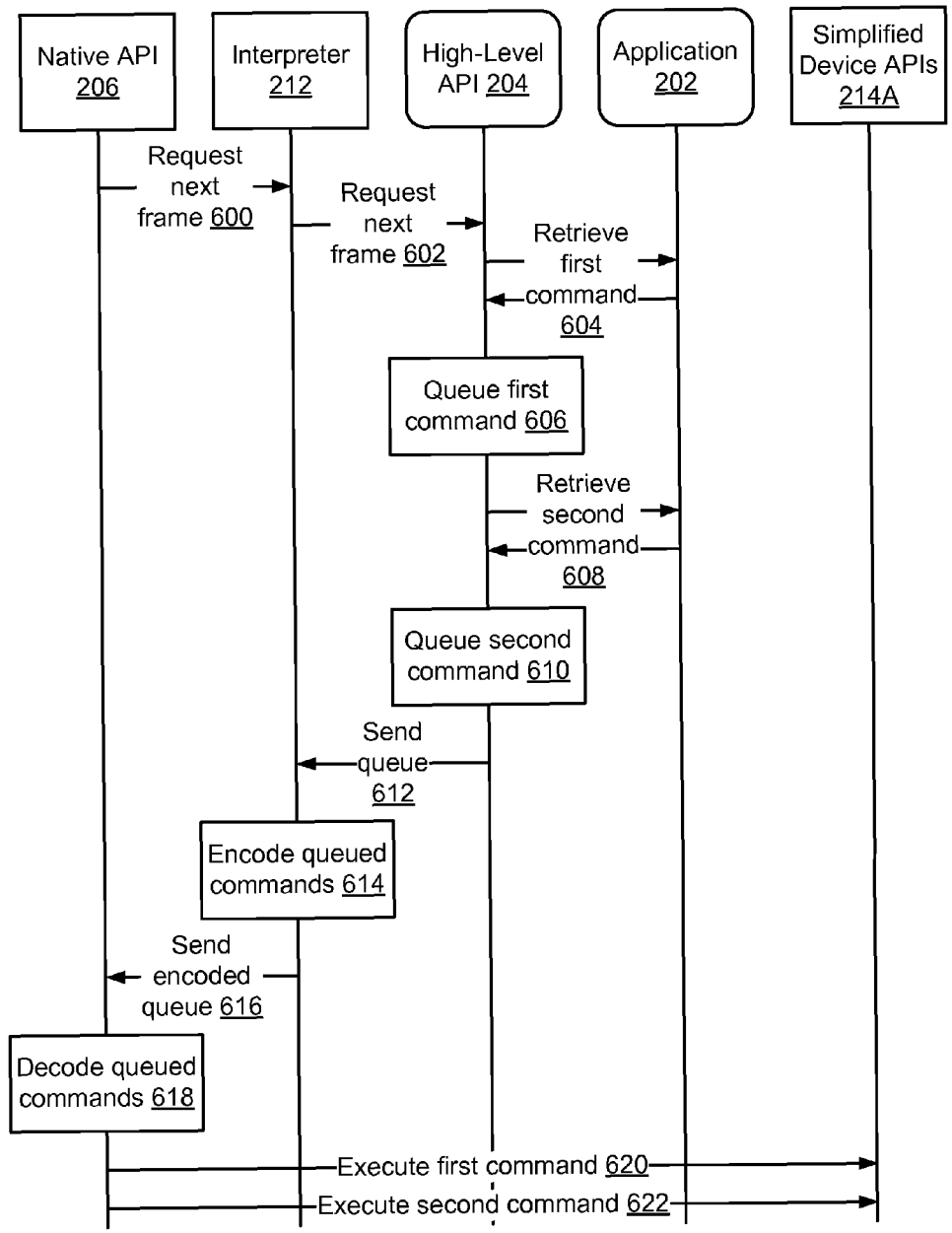
FIG. 6 is an interaction diagram illustrating an example process for executing multiple commands for a single processing frame of an application, according to one embodiment.
Figure 7:
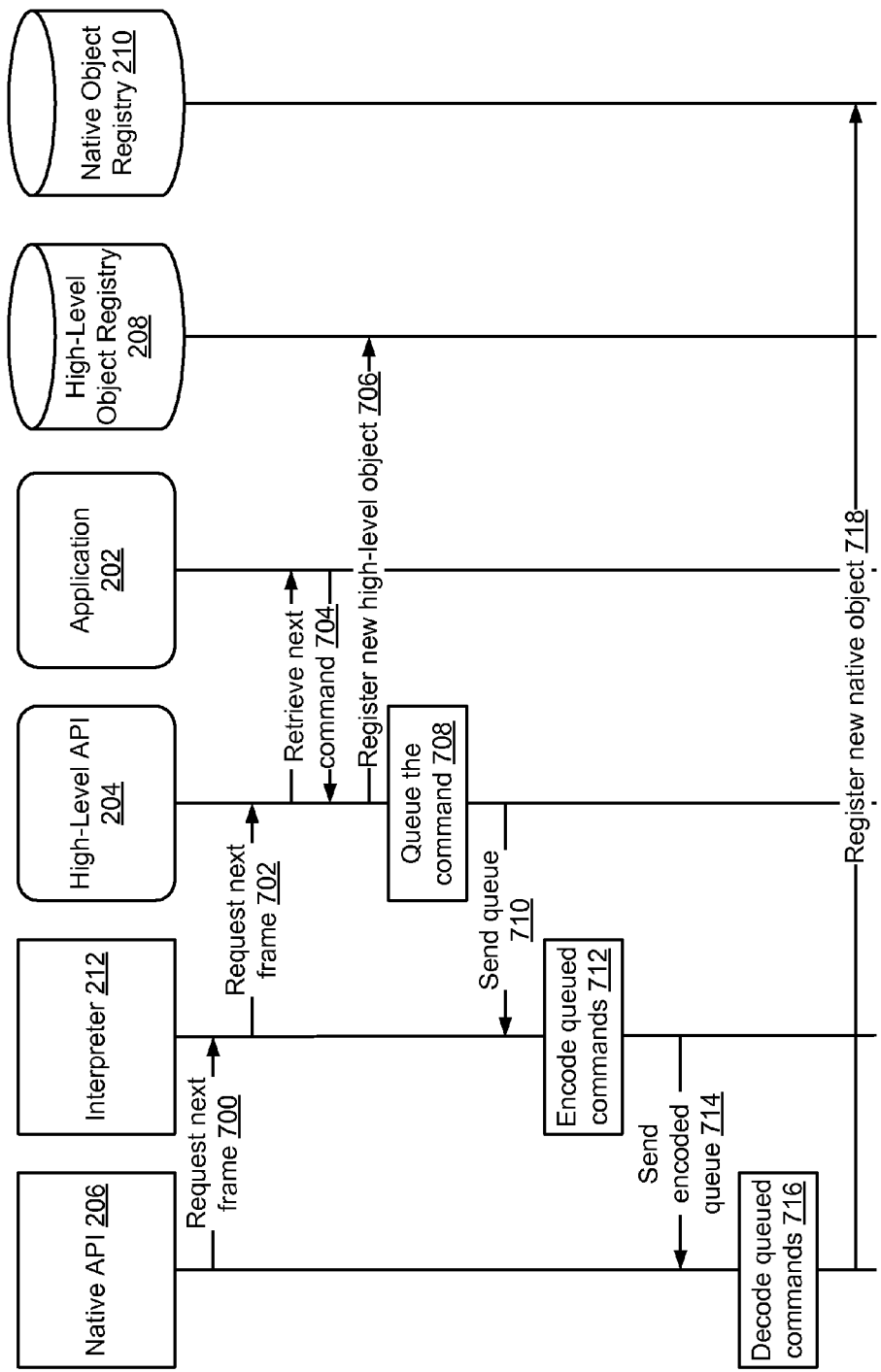
FIG. 7 is an interaction diagram illustrating an example process for registering a new object for an application, according to one embodiment.

Referring now to FIGS. 6 and 7, illustrated are two examples of how a high-level application may use the communication protocol shown in FIG. 4 to interact with resources on the client device 100 and within the application client module 116. FIG. 6 is an interaction diagram illustrating a process for processing a series of commands in a single processing frame, in accordance with one embodiment. At a high level, an application 202 issues one or more commands during a fixed time interval, and the high-level API 204 adds the commands to a queue. The fixed time interval is called a processing frame. At the end of the processing frame, the commands in the queue are encoded using the communication protocol described with reference to FIG. 4, transferred to the native API 206, and decoded as native commands. The queuing mechanism maintains the order of the original high-level commands throughout the encoding and decoding processes so the native commands may be executed in the same order in which the application 202 issued the corresponding high-level commands.

The process begins when the native API 206 requests 600 the commands for the next processing frame. The request is encoded as a character string and sent to the interpreter 212, which decodes the request and passes 602 it to the high-level API 204. The high-level API 204 analyzes the high-level code in the application 202 and retrieves a first command 604 to be encoded. The retrieved command may perform any function that is typically reserved for native code, such as displaying or modifying a sprite on the screen, playing back audio clips, reading or writing to files in the memory 108, or monitoring input from the physical sensors 112. After retrieving 604 the first command, the high-level API adds 606 the first command to a queue.

After retrieving 604 and queuing 606 the first command, the high-level API 204 performs the same process to retrieve 608 and queue 610 additional commands. Although the retrieval and queuing processes are only shown for a total of two commands, the high-level API 204 may continue adding additional high-level commands to the queue for the duration of the processing frame. At the end of the processing frame, the high-level API 204 sends 612 the queue of high-level commands to the interpreter 212, and the interpreter 212 encodes 614 each queued command as a character string according to the communication protocol described with reference to FIG. 4.

The interpreter 212 sends 616 the encoded queue of character strings to the native API 206, which decodes 618 the character strings into native commands and executes 620, 622 the native commands. Since the order of the original high-level commands was preserved while the commands were queued 606, 610, encoded 614, transferred 616, and decoded 618, the native commands are executed 620, 622 in the same order in which the high-level commands were queued. Preserving the order of the commands is important because commands that are performed in an incorrect order may yield incorrect results. For example, a series of commands to place an image on the screen, translate the image, and rotate the image about an origin would yield a different result if the translation and rotation steps were performed in the opposite order.

The queuing mechanism reduces processing overhead and improves the performance of the applications 202 because the process of crossing the processing boundary between high-level and native code (e.g., the process of encoding 614, sending 616, and decoding 618 a command) may be relatively resource-intensive. This is especially important if the client device 100 is a mobile device with limited processing power and battery life. By processing the commands of an entire processing frame at once, the application client module crosses the processing boundary once per processing frame rather than once per command.

FIG. 7 is an interaction diagram illustrating a process for registering a new object on the two different object registries 208, 210 that the application client module 116 maintains, in accordance with one embodiment. The process for registering an object begins in the same manner as the process described with reference to FIG. 6. First, the native API 206 requests 700 the commands for the next processing frame. The native API 206 encodes the request as a character string and sends the request to the interpreter 212, which decodes the request and passes 702 it to the high-level API 204. The high-level API 204 analyzes the high-level code in the application 202 and retrieves 704 the next command to be encoded. If the high-level API retrieves 704 a command to register a new object, then the high-level API 204 registers 706 the object in the high-level object registry 208 before adding the command to the queue 708.

In one embodiment, the high-level API 204 assigns an instance identifier to the new object when registering 706 the object in the high-level registry 208. The registration command may also contain a class identifier to identify the type of object being registered. Together, the class identifier and the instance identifier allow the high-level API 204 to uniquely identify the object, and both identifiers are saved in the object registry. In alternative embodiments, the class identifier and the instance identifier may be merged into a single composite identifier that may be used to uniquely identify the object.

At the end of the processing frame, the high-level API 204 sends 710 the queued commands to the interpreter 212 and the commands in the queue are encoded 712, sent 714, and decoded 716 using the process described with reference to FIGS. 5 and 6. As shown in FIG. 4, the instance and class identifiers are encoded and sent as part of the character string. Although only one register command is shown in FIG. 7, the high-level API 204 may retrieve and add additional commands to the queue during the processing frame, either before or after retrieving 704 and queuing 708 the object registration command that is shown. After the commands for the processing frame are decoded 716 into native commands, the native API 206 executes the object registration command and registers 718 the object in the native object registry 210. The same numerical instance identifier is used to register 718 the object in the native object registry 210. This process allows the application client module 116 to maintain two mirrored copies 208, 210 of the object registry so that commands that reference one or more of the objects may be executed by the native code.

The disclosed configurations beneficially allow developers to write high-level software applications 202 that are indistinguishable to users from applications that run natively on a client device 100. The combination of the simplified device APIs 214 and the communication protocol implemented in the application client module 116 allow high-level applications 202 to access system resources, such as graphics functions, user interface functions, networking devices 110, and physical sensors 112, that are typically reserved for native applications. As a result, developers are able to write high-level applications 202 that perform the same functions as native applications. In addition, the disclosed configurations allow for high-level applications 202 to be updated without being subject to any restrictions that the operating system of a client device 100 may place on updates for native application. This allows the application client module 116 to automatically apply updates that may be tailored to a user's geographic location, demographic information, client device configuration, or other personal details, which results in a more customized user experience that enhances the value of the high-level application 202.

Additional Configuration Considerations

Throughout this specification, plural instances may implement components, operations, or structures described as a single instance. Although individual operations of one or more methods are illustrated and described as separate operations (e.g., in FIG. 5), one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms (e.g., in FIGS. 1, 2, 3, 6, and 7). Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for communicating between high-level and native code through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for communicating between two programming languages, comprising:
   receiving one or more commands in a first programming language, each command comprising a plurality of components;
   encoding each of the received commands as a character string, the character string comprising:
      a first type of control character marking a beginning of the command,
      a plurality of numbers identifying each of the plurality of components of the command, and
      a second type of control character separating each of the plurality of numbers;
   decoding the encoded character strings into at least one command in a second programming language, each command in the second programming language corresponding to one of the received commands in the first programming language and performing an analogous task as the corresponding received command in the first programming language; and executing the at least one command in the second programming language.

2. The method of claim 1, wherein receiving one or more commands in the first programming language comprises receiving a queue containing the one or more commands, the order of the commands in the queue indicating the order in which the commands are to be executed.

3. The method of claim 2, wherein executing at least command in the second programming language comprises executing the at least command in the same order in which the corresponding commands in the first programming language were arranged in the queue.

4. The method of claim 1, wherein each of the received commands in the first programming language comprises:
 a class identifier identifying a type of object;
 a method identifier identifying a member function within the identified class; and
 one or more input parameters to be used in the identified method.

5. The method of claim 4, wherein the plurality of numbers identifying each of the components of the command comprises:
 a first number identifying the class identifier;
 a second number identifying the method identifier;
 a third number identifying an instance of an object within the identified class; and
 one or more additional numbers corresponding to the values of the one or more input parameters.

6. The method of claim 4, wherein the plurality of numbers identifying each of the components of the command comprises:
 a first number identifying the class identifier and the method identifier;
 a second number identifying an instance of an object within the identified class; and
 one or more additional numbers corresponding to the values of the one or more input parameters.

7. A computing system for communicating between a high-level programming language and binary code running natively on the computing system, comprising:
 a processor; and
 an interpreter module configured to:
  receive one or more commands in the high-level programming language, each command comprising a plurality of components, and
  encode each of the received commands as a character string, the character string comprising: a first type of control character marking a beginning of the command, a plurality of numbers identifying each of the plurality of components of the command, and a second type of control character separating each of the plurality of numbers; and
 a native module configured to:
  receive one or more character strings from the interpreter module,
  decode the one or more character strings into at least one command executable by the binary code, each executable command corresponding to one of the received commands in the high-level programming language and performing an analogous task as the corresponding command in the high-level programming language, and
  execute the at least one executable command.

8. The system of claim 7, wherein receiving one or more commands in the high-level programming language comprises receiving a queue containing the one or more commands, the order of the commands in the queue indicating the order in which the commands are to be executed.

9. The system of claim 8, wherein the native module is further configured to execute the at least one command in the same order in which the corresponding commands in the high-level programming language were arranged in the queue.

10. The system of claim 7, wherein each of the received commands in the high-level programming language comprises:
 a class identifier identifying a type of object,
 a method identifier identifying a member function within the identified class, and one or more input parameters to be used in the identified method.

11. The system of claim 10, wherein the plurality of numbers identifying each of the components of the command comprises:
 a first number identifying the class identifier,
 a second number identifying the method identifier,
 a third number identifying an instance of an object within the identified class,
 one or more additional numbers corresponding to the values of the one or more input parameters.

12. The system of claim 10, wherein the plurality of numbers identifying each of the components of the command comprises:
 a first number identifying the class identifier and the method identifier,
 a second number identifying an instance of an object within the identified class, and
 one or more additional numbers corresponding to the values of the one or more input parameters.

13. The system of claim 7, further comprising one or more high-level applications containing a plurality of commands written in the high-level programming language (high-level commands).

14. The system of claim 13, wherein one of the high-level applications is a boot application containing high-level commands, the high-level commands configured to, when encoded by the interpreter module and decoded and executed by the native module, cause the processor to:
 receive one or more additional high-level commands from a remote application server; and
 modify one of the high-level applications by performing at least one of:
  replace at least one of the plurality of high-level commands in the high-level application with at least one of the additional high-level commands; and
  insert at least one of the additional high-level commands into the plurality of high-level commands in the high-level application.

15. A non-transitory computer readable storage medium configured to store instructions, the instructions when executed by a processor cause the processor to:
 receive one or more commands in a first programming language;
 encode each of the received commands as a character string, the character string comprising:
  a first type of control character marking the beginning of the command,
  a plurality of numbers identifying each of the components of the command, and
  a second type of control character separating each of the plurality of numbers;
 decode the encoded character strings into at least command in a second programming language, each command in the second programming language corresponding to one of the received commands in the first programming language and performing an analogous task as the corresponding command in the first programming language; and
 executing the at least command in the second programming language.

16. The computer readable medium of claim 15, wherein receiving one or more commands in the first programming language comprises receiving a queue containing the one or more commands, the order of the commands in the queue indicating the order in which the commands are to be executed.

17. The computer readable medium of claim 16, wherein executing the at least command in the second programming language comprises executing the at least one command in the same order in which the corresponding commands in the first programming language were arranged in the queue.

18. The computer readable medium of claim 15, wherein each of the received commands in the first programming language comprises:
- a class identifier identifying a type of object,
- a method identifier identifying a member function within the identified class, and one or more input parameters to be used in the identified method.

19. The computer readable medium of claim 18, wherein the plurality of numbers identifying each of the components of the command comprises:
- a first number identifying the class identifier,
- a second number identifying the method identifier,
- a third number identifying an instance of an object within the identified class,
- one or more additional numbers corresponding to the values of the one or more input parameters.

20. The computer readable medium of claim 18, wherein the plurality of numbers identifying each of the components of the command comprises:
- a first number identifying the class identifier and the method identifier,
- a second number identifying an instance of an object within the identified class, and
- one or more additional numbers corresponding to the values of the one or more input parameters.

* * * * *

UNITED STATES PATENT AND TRADEMARK OFFICE
CERTIFICATE OF CORRECTION

| | | |
|---|---|---|
| PATENT NO. | : 8,959,492 B2 | Page 1 of 1 |
| APPLICATION NO. | : 13/324940 | |
| DATED | : February 17, 2015 | |
| INVENTOR(S) | : Stephen Cain Detwiler et al. | |

It is certified that error appears in the above-identified patent and that said Letters Patent is hereby corrected as shown below:

IN THE CLAIMS

Column 15, Claim 3, lines 8–10, each occurrence of "at least command" replace with --at least one command--.

Column 16, Claim 15, lines 60 and 66, each occurrence of "at least command" replace with --at least one command--.

Column 17, Claim 17, line 8, replace "at least command" with --at least one command--.

Signed and Sealed this
Sixteenth Day of February, 2016

Michelle K. Lee
*Director of the United States Patent and Trademark Office*